United States Patent
Unrath

(10) Patent No.: US 9,724,782 B2
(45) Date of Patent: Aug. 8, 2017

(54) LASER SYSTEMS AND METHODS FOR AOD TOOL SETTLING FOR AOD TRAVEL REDUCTION

(71) Applicant: ELECTRO SCIENTIFIC INDUSTRIES, INC., Portland, OR (US)

(72) Inventor: Mark A. Unrath, Portland, OR (US)

(73) Assignee: Electro Scientific Industries, Inc., Portland, OR (US)

(*) Notice: Subject to any disclaimer, the term of this patent is extended or adjusted under 35 U.S.C. 154(b) by 656 days.

(21) Appl. No.: 14/211,162

(22) Filed: Mar. 14, 2014

(65) Prior Publication Data
US 2014/0263223 A1    Sep. 18, 2014

Related U.S. Application Data

(60) Provisional application No. 61/791,656, filed on Mar. 15, 2013, provisional application No. 61/791,160, filed on Mar. 15, 2013.

(51) Int. Cl.
*B23K 26/03*    (2006.01)
*B23K 26/08*    (2014.01)
(Continued)

(52) U.S. Cl.
CPC ........ *B23K 26/032* (2013.01); *B23K 26/0622* (2015.10); *B23K 26/082* (2015.10);
(Continued)

(58) Field of Classification Search
CPC .. G02B 16/101; G02B 26/105; B23K 26/032; B23K 26/0622; B23K 26/082;
(Continued)

(56) References Cited

U.S. PATENT DOCUMENTS 5,841,099 A    11/1998   Owen et al.
6,433,301 B1    8/2002   Dunsky et al.
(Continued)

FOREIGN PATENT DOCUMENTS

JP    2003136270 A    5/2003
JP    P2008-49383 A    3/2008
(Continued)

OTHER PUBLICATIONS

Notification of Transmittal of the International Search Report and the Written Opinion of the International Searching Authority, or the Declaration for PCT/US2014/027439, dated Jul. 30, 2014.
(Continued)

*Primary Examiner* — Geoffrey S Evans

(57) ABSTRACT

Laser systems and methods insert a settling time before and after each tooling action. A peak AOD excursion generally occurs at the transition in velocity between inter-feature moves and tooling moves. This transition occurs both before tooling (on the approach to the tooling location) and after tooling (on the departure from the completed tooling location to the next location). By adding a settling delay on each end of the tooling period, the AOD excursion is allowed to settle to a lower value. This then allows higher inter-tooling velocities (for high throughput) while keeping the AOD travel excursion within the bounds of the system's AOD configuration.

18 Claims, 7 Drawing Sheets

(51) Int. Cl.
*B23K 26/38* (2014.01)
*B23K 26/386* (2014.01)
*G02B 26/10* (2006.01)
*B23K 26/082* (2014.01)
*B23K 26/0622* (2014.01)
*B23K 26/388* (2014.01)

(52) U.S. Cl.
CPC .......... *B23K 26/0853* (2013.01); *B23K 26/38* (2013.01); *B23K 26/386* (2013.01); *B23K 26/388* (2013.01); *G02B 26/101* (2013.01); *G02B 26/105* (2013.01)

(58) Field of Classification Search
CPC .. B23K 26/0853; B23K 26/38; B23K 26/386; B23K 26/388; G02F 1/33
See application file for complete search history.

(56) References Cited

U.S. PATENT DOCUMENTS

| | | | |
|---|---|---|---|
| 6,676,878 | B2 | 1/2004 | O'Brien et al. |
| 6,706,999 | B1 | 3/2004 | Barrett et al. |
| 7,133,186 | B2 | 11/2006 | Johnson |
| 7,244,906 | B2 | 7/2007 | Jordens et al. |
| 7,259,354 | B2 | 8/2007 | Pailthorp et al. |
| 7,425,471 | B2 | 9/2008 | Bruland et al. |
| 8,026,158 | B2 | 9/2011 | Bruland et al. |
| 8,288,679 | B2 | 10/2012 | Unrath et al. |
| 8,404,998 | B2 | 3/2013 | Unrath et al. |
| 8,680,430 | B2 | 3/2014 | Unrath |
| 2002/0117481 | A1 | 8/2002 | Unrath et al. |
| 2005/0128553 | A1 | 6/2005 | Toyama et al. |
| 2005/0224469 | A1 | 10/2005 | Cutler et al. |
| 2005/0270631 | A1* | 12/2005 | Johnson .............. B23K 26/0626 359/305 |
| 2006/0027544 | A1* | 2/2006 | Pailthorp ............. H05K 3/0026 219/121.71 |
| 2007/0084837 | A1 | 4/2007 | Kosmowski |
| 2008/0029491 | A1 | 2/2008 | Johnson et al. |
| 2010/0140237 | A1* | 6/2010 | Unrath ............... B23K 26/0807 219/121.72 |
| 2010/0155381 | A1 | 6/2010 | Kuhl et al. |
| 2010/0252959 | A1 | 10/2010 | Lei et al. |
| 2010/0301023 | A1 | 12/2010 | Unrath et al. |
| 2011/0210103 | A1* | 9/2011 | Bruland ............... B23K 26/082 219/121.67 |
| 2012/0273472 | A1 | 11/2012 | Unrath et al. |

FOREIGN PATENT DOCUMENTS

| | | |
|---|---|---|
| WO | WO 2009/087392 A1 | 7/2009 |
| WO | WO2011/131933 A1 | 10/2011 |

OTHER PUBLICATIONS

International Search Report and Written Opinion of PCT/US2014/027439, 10 pages.

* cited by examiner

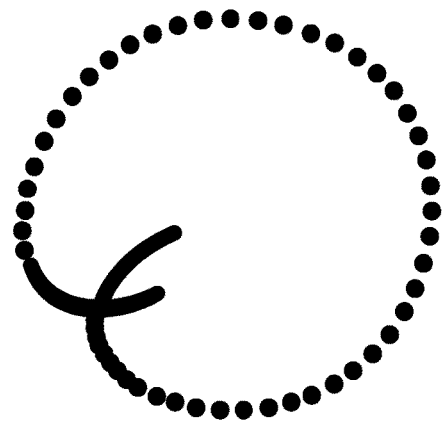
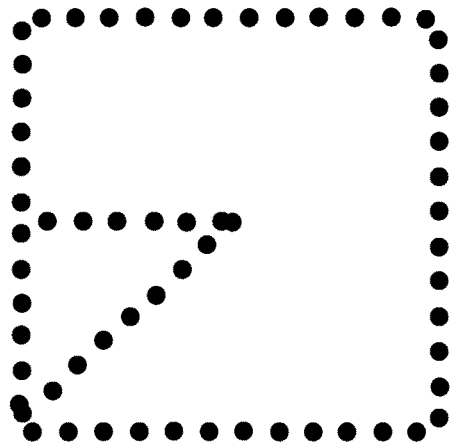
FIG. 3
FIG. 4
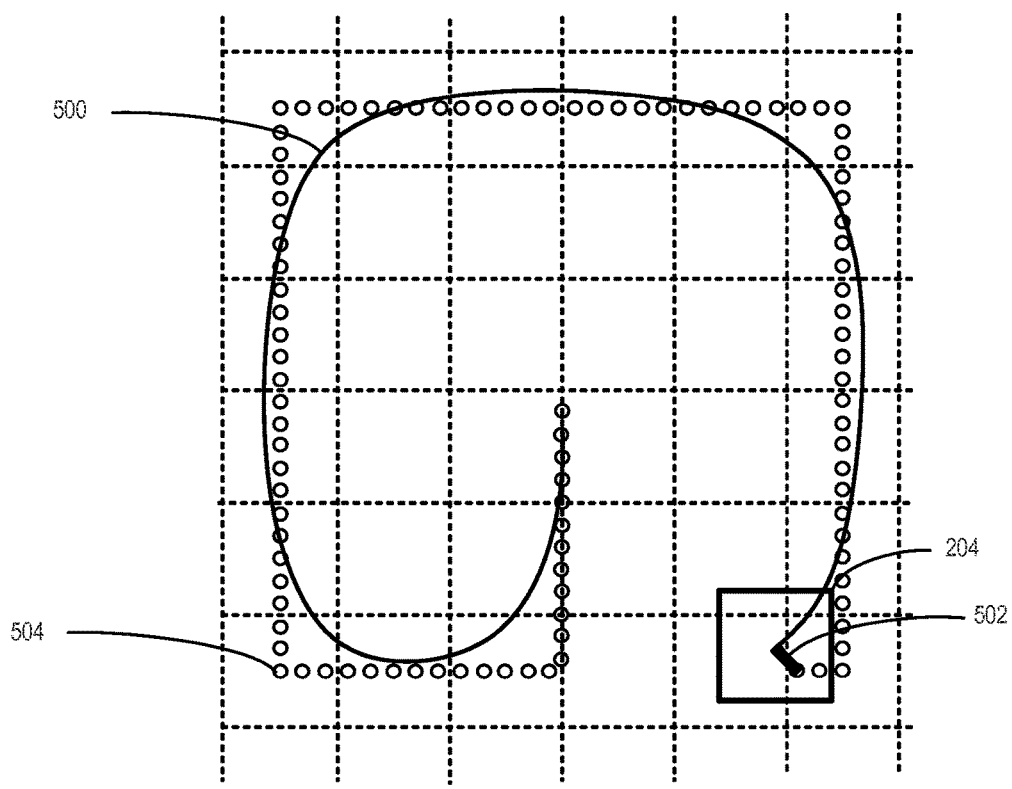
FIG. 5

LASER SYSTEMS AND METHODS FOR AOD TOOL SETTLING FOR AOD TRAVEL REDUCTION

RELATED APPLICATIONS

This application claims the benefit under 35 U.S.C. §119 (e) of U.S. Provisional Application No. 61/791,656, filed Mar. 15, 2013, and of U.S. Provisional Application No. 61/791,160, filed Mar. 15, 2013, both of which are hereby incorporated by reference herein in their entirety.

TECHNICAL FIELD

This disclosure relates generally to laser processing apparatuses and to methods of processing workpieces using the same.

BACKGROUND INFORMATION

A laser processing system for micromachining a workpiece may include a laser source to generate laser pulses for processing a feature in a workpiece, and a galvanometer-driven (galvo) subsystem to impart a first relative movement of a laser beam spot position along a processing trajectory with respect to the surface of the workpiece. The laser processing system may also include an acousto-optic deflector (AOD) subsystem to provide, for example, galvo error position correction, rastering, power modulation, and/or dithering. The AOD subsystem may include a combination of AODs and electro-optic deflectors.

The generation of AOD commands through tertiary filtering can result in AOD excursions beyond a desired or available AOD operating range. This may occur, for example, when the moves between process features are very rapid (at a high inter-feature velocity). Generally, it is desirable to maintain high inter-feature beam velocities to improve throughput, yet the restrictions of AOD excursion can normally limit these velocities.

SUMMARY OF THE DISCLOSURE

Embodiments of the present disclosure, as examples described herein, address the limitations discussed above and other limitations associated with conventional methods of laser processing routs and other features in a workpiece. As discussed below, certain embodiments optimize or improve the processing velocity of the routs or other features to avoid exceeding the laser system's dynamic limits.

In certain embodiments, laser systems and methods insert a settling time before and after each tooling action. A peak AOD excursion[in a tertiary filter architecture] generally occurs at the transition in velocity between inter-feature moves and tooling moves. This transition occurs both before tooling (on the approach to the tooling location) and after tooling (on the departure from the completed tooling location to the next location). By adding a settling delay on each end of the tooling period, the AOD excursion is allowed to settle to a lower value. This then allows higher inter-tooling velocities (for high throughput) while keeping the AOD travel excursion within the bounds of the system's AOD configuration.

Additional aspects and advantages will be apparent from the following detailed description of preferred embodiments, which proceeds with reference to the accompanying drawings.

BRIEF DESCRIPTION OF THE DRAWINGS

FIG. 3 and FIG. 4 graphically illustrate patterns of spots created by scanning a beam position relative to a workpiece, according to certain embodiments of the present disclosure.

FIG. 5 is a chart schematically illustrating one embodiment of a process of forming the pattern of spots shown in FIG. 4.

DETAILED DESCRIPTION OF PREFERRED EMBODIMENTS

Figure 1:
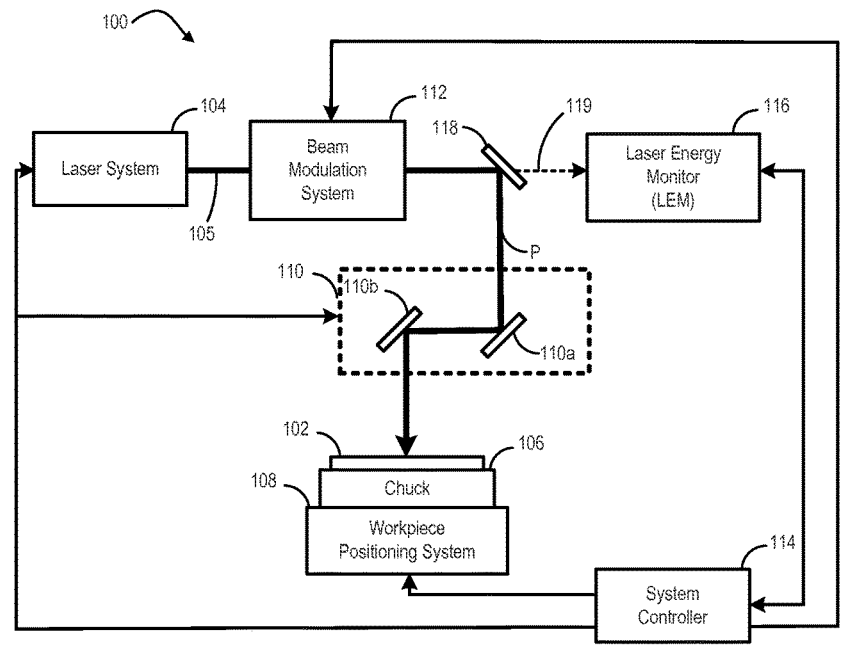
FIG. 1 schematically illustrates a laser processing apparatus according to one embodiment of the present disclosure.

Example embodiments are described below with reference to the accompanying drawings. Many different forms and embodiments are possible without deviating from the spirit and teachings of the invention and so the disclosure should not be construed as limited to the example embodiments set forth herein. Rather, these example embodiments are provided so that this disclosure will be thorough and complete, and will convey the scope of the invention to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

As discussed above, the generation of AOD commands through tertiary filtering can result in AOD excursions beyond a desired or available AOD operating range. This may occur, for example, when the moves between process features are very rapid (at a high inter-feature velocity). Generally, it is desirable to maintain high inter-feature beam velocities to improve throughput, yet the restrictions of AOD excursion can normally limit these velocities.

To avoid or reduce the limits on process velocities imposed by tertiary filtering, certain embodiments disclosed herein insert a settling time before and after each tooling action. As discussed below, the peak AOD excursion occurs at the transition in velocity between inter-feature moves (typically high velocity) and tooling moves (typically lower velocities). This transition occurs both before tooling (on the approach to the tooling location) and after tooling (on the departure from the completed tooling location to the next location). By adding a settling delay on each end of the tooling period, the AOD excursion is allowed to settle to a lower value. This then allows higher inter-tooling velocities (for high throughput) while keeping the AOD travel excursion within the bounds of the system's AOD configuration.

In certain embodiments discussed below, a method of "settling" at a tooling velocity and trajectory is well suited for the AOD travel reduction settling. This may be useful, for example, when processing a tooling trajectory with a large diameter or velocity, which may create its own large AOD transient even after dwelling at zero velocity at the feature location.

Before discussing example AOD tool settling embodiments and example embodiments for settling at tooling velocity and trajectory, an example laser processing apparatus and example tertiary profiling embodiments are provided.

I. Example System Overview

Referring to FIG. 1, a laser processing apparatus 100 is configured to form routs and other features (e.g., through-vias, blind vias, trenches, and kerfs) within one or more materials of a workpiece 102 by directing a beam 105 of laser pulses along a path P to impinge upon the workpiece 102. Features may be formed by controlling the laser processing apparatus 100 to perform a routing action and/or other tooling actions (e.g., a percussion drilling action, a trepan drilling action, a skiving action, and a cutting action), wherein each tooling action may include one or more steps. As illustrated, the laser processing apparatus 100 may include a laser system 104, a chuck 106, a workpiece positioning system 108, a beam positioning system 110, and a beam modulation system 112. Although not illustrated, the laser processing apparatus 100 may further include one or more supplemental systems (e.g., optics, mirrors, beam splitters, beam expanders, and/or beam collimators) configured to shape, expand, focus, reflect, and/or collimate the beam 105 of laser pulses at any point along the path P. In one embodiment, a set of one or more supplemental systems may be referred to as an "optics train."

In one embodiment, the operation of one or more or all of the workpiece positioning system 108, beam positioning system 110, and beam modulation system 112 may be controlled to change the position of where the beam 105 of laser pulses impinges upon the workpiece 102 (i.e., the beam position relative to the workpiece 102). In addition, or in other embodiments, the operation of one or more or all of the workpiece positioning system 108, beam positioning system 110, and beam modulation system 112 may be controlled to change the velocity and/or acceleration with which the beam position changes relative to the workpiece 102.

The laser system 104 may be configured to generate the beam 105 of laser pulses. Laser pulses within the beam 105 may, for example, have a wavelength in the infrared, visible, or ultraviolet spectrums. For example, laser pulses within the beam 105 may have a wavelength such as 1064 nm, 532 nm, 355 nm, 266 nm, and the like. Laser pulses within the beam 105 are may generally generated at a PRF in a range from about 20 kHz to about 2000 kHz. It will be appreciated, however, that the PRF may be less than 20 kHz or greater than 2000 kHz. For example, mode-locked laser may run up to 200 MHz.

The chuck 106 may be provided as any chuck capable of suitably or beneficially supporting the workpiece 102. In one embodiment, the chuck 106 can be provided as a vacuum chuck, an electrostatic chuck, a mechanical chuck, or the like or a combination thereof.

Figure 2:
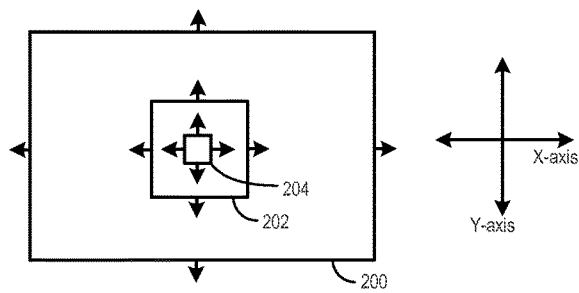
FIG. 2 schematically illustrates scan fields associated with various components or systems of the apparatus shown in FIG. 1.

The workpiece positioning system 108 is configured to translate the chuck 106, which supports the workpiece 102, along one or more directions parallel to an X-axis, Y-axis, and/or Z-axis (where the Z-axis is at least substantially perpendicular to the surface of the chuck 106, and where the X-axis, Y-axis, and Z-axis are mutually orthogonal to each other), to rotate the chuck 106 about one or more of the X-axis, Y-axis, and/or Z-axis, or the like or a combination thereof. In one embodiment, the workpiece positioning system 108 may include one or more stages configured to move the chuck as discussed above. When a workpiece 102 is supported by the chuck 106, the workpiece positioning system 108 can be operated to move or scan the workpiece 102 (e.g., along the X-axis and Y-axis) within a first scan field (e.g., first scan field 200, as shown in FIG. 2) relative to the path P. In one embodiment, the workpiece positioning system 108 can be operated to scan the workpiece 102 in any direction along the X-axis for a distance in a range from about 400 to about 700 mm (e.g., about 635 mm), in any direction along the Y-axis for a distance in a range from about 400 mm to about 700 mm (e.g., about 533 mm), or a combination thereof.

The beam positioning system 110 is configured to deflect, reflect, refract, diffract, or the like, or a combination thereof, the beam 105 of laser pulses to scan the beam position within a second scan field (e.g., second scan field 202, as shown in FIG. 2) relative to the workpiece 102. In one embodiment, the beam positioning system 110 can be operated to scan the beam position in any direction along the X-axis for a distance in a range from about 1 mm to about 50 mm (e.g., about 30 mm), in any direction along the Y-axis for a distance in a range from about 1 mm to about 50 mm (e.g., about 30 mm), or a combination thereof. Generally, operation of the beam positioning system 110 can be controlled to scan the beam position relative to the workpiece 102 at a velocity and/or acceleration that is greater than that by which the workpiece positioning system 108 can scan the workpiece 102 within the first scan field 200. In the illustrated embodiment, the beam positioning system 110 includes a pair of galvanometer-based mirrors (galvos) 110a and 110b, disposed within the path P. The galvos 110a, 110b are configured to be rotated (e.g., about the X-axis or Y-axis), thereby deflecting the path P and scanning the beam position within the second scan field 202. It will be appreciated, however, that the beam positioning system 110 may be configured in any other suitable or beneficial manner.

The beam modulation system 112 is configured to deflect, reflect, refract, diffract, or the like, or a combination thereof, the beam of laser pulses to scan the beam position within a third scan field (e.g., third scan field 204, as shown in FIG. 2) relative to the workpiece 102. In one embodiment, the beam modulation system 110 can be operated to scan the beam position in any direction along the X-axis for a distance in a range from about 0.05 mm to about 0.2 mm (e.g., about 0.1 mm), in any direction along the Y-axis for a distance in a range from about 0.05 mm to about 0.2 mm (e.g., about 0.1 mm), or a combination thereof. Those persons skilled in the art will recognize that these ranges are provided by way of example and that the beam position may be scanned within smaller or larger ranges. Generally, operation of the beam modulation system 112 can be controlled to scan the beam position relative to the workpiece 102 at a velocity and/or acceleration that is greater than that by which the beam positioning system 110 can scan beam position within the second scan field.

In one embodiment, the beam modulation system 112 includes a single acousto-optic deflector (AOD) configured to deflect the beam 105 of laser pulses to scan the beam position along a single axis within the third scan field 204. In another embodiment, the beam modulation system 112 includes two AODs, wherein a first AOD is configured to deflect the beam 105 of laser pulses and scan the beam position within the third scan field 204 along the X-axis and a second AOD is configured to deflect the beam 105 of laser pulses and scan the beam position within the third scan field 204 along the Y-axis. It will be appreciated, however, that the beam modulation system 112 may be configured in any other suitable or beneficial manner. For example, the beam modulation system 112 may include one or more acousto-optic modulators (AOMs), electro-optic deflectors (EODs), electro-optic modulators (EOMs), fast steering mirrors (FSMs) (e.g., high-bandwidth (greater than about 10 kHz) FSMs), or the like or a combination thereof in addition to, or as a substitute for, an AOD.

The laser processing apparatus 100 may further include a system controller 114 communicatively coupled to the workpiece positioning system 108, the beam positioning system 110, the beam modulation system 112, and the laser system 104. The system controller 114 is configured to control the aforementioned operation of one or more or all of these systems (the workpiece positioning system 108, the beam positioning system 110, the beam modulation system 112, and/or the laser system 104) to form features (e.g., routs, through-vias, blind vias, trenches, kerfs, and other features) within the workpiece 102. In one embodiment, the system controller 114 can control an operation of the laser system 104 to change the PRF (e.g., within a range from about 20 kHz to about 2000 kHz) of pulses generated by the laser system 104.

In one embodiment, the system controller 114 may control an operation of the beam modulation system 112 to scan the beam position relative to the workpiece 102 and form a "high feature-density region" within the workpiece 102 (e.g., a region containing features separated by a pitch of less than or equal to 500 μm, or thereabout). The system controller 114 may further control an operation of the beam positioning system 110 and/or the workpiece positioning system 108 while forming the high feature-density region.

In another embodiment, the system controller 114 may control an operation of the beam positioning system 110 to scan the beam position relative to the workpiece 102 and form a "medium feature-density region" within the workpiece 102 within the workpiece 102 (e.g., a region containing features separated by a pitch greater than 500 μm, or thereabout, such as about 1000 μm). The system controller 114 may further control an operation of the beam modulation system 112 and/or the workpiece positioning system 108 while forming the medium feature-density region.

In yet another embodiment, the system controller 114 may control an operation of the beam positioning system 110 and further control an operation of the beam modulation system 112 in a coordinated manner to overcome high-speed velocity limitations, small-area positioning errors, and bandwidth limitations of the beam positioning system 110. For example, if the laser processing apparatus 100 did not include the beam modulation system 112, the beam positioning system 110 could be controlled to scan the beam position relative to the workpiece 102 such that laser pulses within the beam sequentially impinge upon the workpiece 102 to form a rounded pattern of spots as shown in FIG. 3 (as shown, the circle-shaped pattern of spots has a maximum width of about 600 μm). By coordinating operation of the beam modulation system 112 with the beam positioning system 110, however, the laser processing apparatus 100 can be configured to form a square-shaped pattern of spots as shown in FIG. 4 (as shown, the square-shaped pattern of spots has a dimension of about 600 μm×about 600 μm).

In one embodiment, and with reference to FIG. 5, the pattern of spots shown in FIG. 4 can be formed by controlling the beam positioning system 110 to scan the beam position within the second scan field 202 along a line such as line 500, and the beam modulation system 112 can be controlled to further scan the beam position within the third scan field 204 (which is centered at the end of the line 500) along a direction (e.g., indicated by line 502, centered within the third scan field 204) such that laser pulses sequentially impinge upon the workpiece 102 to form a square-shaped pattern of spots 504 (e.g., such as that shown in FIG. 4). By applying the example process as discussed above with respect to FIG. 5, the beam position can be scanned over the workpiece at a rate of about 5 meters per second (m/s), or even higher, depending on the galvo capabilities. It will be appreciated, however, that operation of the beam modulation system 112 with the beam positioning system 110 can be coordinated in any manner to form any suitable or beneficial pattern of spots on the workpiece 102.

Generally, the system controller 114 can include operating logic (not shown) that defines various control functions, and may be in the form of dedicated hardware, such as a hardwired state machine, a processor executing programming instructions, and/or a different form as would occur to those skilled in the art. Operating logic may include digital circuitry, analog circuitry, software, or a hybrid combination of any of these types. In one embodiment, the system controller 114 may include a processor such as a programmable microcontroller, microprocessor, or other processor that can include one or more processing units arranged to execute instructions stored in memory in accordance with the operating logic. Memory (e.g., computer-readable medium) can include one or more types including semiconductor, magnetic, and/or optical varieties, and/or may be of a volatile and/or nonvolatile variety. In one embodiment, memory stores instructions that can be executed by the operating logic. Alternatively or additionally, memory may store data that is manipulated by the operating logic. In one arrangement, operating logic and memory are included in a controller/processor form of operating logic that manages and controls operational aspects the workpiece positioning system 108, the beam positioning system 110 and/or the beam modulation system 112, although in other arrangements they may be separate.

As described herein, the laser processing apparatus 100 is configured to enable coordinated operation of the beam positioning system 110 and the beam modulation system 112 to form features at high speed and with high positional accuracy. In certain embodiments, the laser processing apparatus 100 can further include a laser power control (LPC) system having, for example, the beam modulation system 112 and the system controller 114, as well as other systems such as a laser energy monitor (LEM) 116. Generally, the LPC system may be configured to measure the pulse energy of individual laser pulses (e.g., for quality and control purposes), control the pulse energy of individual laser pulses, facilitate rapid changes to pulse energy and PRF, coordinate the pulse energy control of individual laser pulses with beam position, coordinate generation and modulation of the laser pulses, or the like or a combination thereof.

II. Example Tertiary Profiling Embodiments

Figure 6:
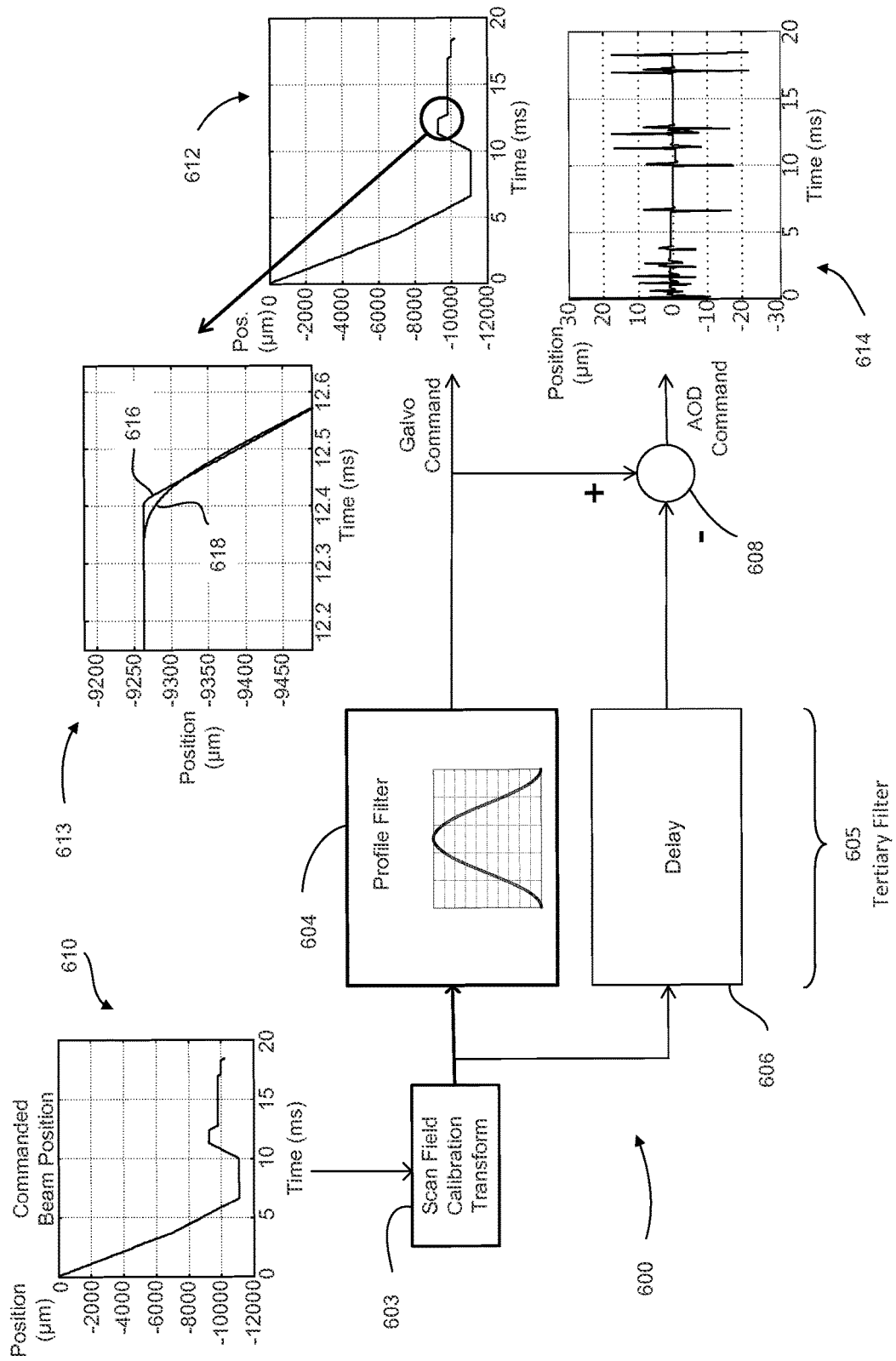
FIG. 6 schematically illustrates a tertiary profiling subsystem according to one embodiment.

FIG. 6 schematically illustrates a tertiary profiling subsystem 600 according to one embodiment. In tertiary profiling, beam positioning is split between the beam positioning system 110 (with galvos 110a and 110b) and the beam modulation system 112 (with one or more AODs). Tertiary profiling refers to using the AODs as a tertiary positioner (e.g., in addition to XY stages and the galvos 110a, 110b). Tertiary profiling using the AODs allows for profiling the beam path at high speed (e.g., using updates at about 1 µs to provide timing resolution) wherein AOD commands are issued on discrete timing boundaries. The tertiary profiling subsystem 600 includes a profiling filter 604, delay element 606, and a subtractor 608.

FIG. 6 illustrates an example beam profile 610 (which may also be referred to herein as an example "beam command") corresponding to a trench that is desired to be cut into a workpiece. However, the basic principles may be applied to embodiments that move from one processing feature to another, such as when processing a plurality of vias.

The example beam profile 610 shown in FIG. 6 includes sharp turns that may be difficult to track at high velocities using the galvo 110a, 110b. After passing through a scan field calibration transform 603, the example beam profile 610 is provided to a tertiary filter 605, which includes the profiling filter 604 and the delay element 606. The profiling filter 604 comprises a low-pass filter that filters out high frequency content that may be difficult for the galvos 110a, 110b to track. The output of the profiling filter 604 may be used as a galvo command (galvo control signal), as shown by position profile 612. FIG. 6 illustrates an enlarged portion 613 of the position profile 612, which shows a commanded position 616 with respect to an actual position 618 provided by the galvos 110a, 110b. The AODs are used to correct for the difference between the commanded position 616 and the actual position 618.

In one embodiment, the profiling filter 604 comprises an infinite impulse response (IIR) filter. In another embodiment, the profiling filter 604 comprises a finite impulse response (FIR) filter. FIR filters naturally have a constant delay for signals in any frequency range. An artisan will recognize from the disclosure herein, however, that other types of filters may also be used. The delay element 606 delays the example beam profile 610 by approximately the same amount of delay introduced by the profiling filter 604. The subtractor 608 subtracts the output of the profiling filter 604 from the output of the delay element 606 to get the high frequency content that was removed from the galvo command. The high frequency content output by the subtractor 608 may then be used as an AOD command signal for controlling the AODs. FIG. 6 illustrates an example AOD position command profile 614. Although not shown, differentials may be used on the position command profile 614 to calculate corresponding velocity and acceleration command profiles.

The example beam command 610 is the desired trajectory of the beam on the work surface, after application of panel alignment transforms, in "desired" coordinates. As discussed above, the example beam profile 610 is provided (as a commanded beam position signal) to the scan field calibration transform 603. The data is filtered to split the trajectory into low- and high-frequency components, allowing the AODs to track high-frequency, low-amplitude commands, and passing bandwidth-limited, large-amplitude commands to the galvos 110a, 110b. Applying the scan field calibration transform 603 produces "raw galvo" coordinates. Since this occurs before commands are split by the tertiary filter 605, the outputs of the tertiary filter 605 are galvo and AOD components, each of which are in the same raw galvo coordinates.

If the AODs are calibrated to deflect the beam in the raw galvo coordinate frame, no further scan field calibration transform is required for the AOD tertiary displacement. This is useful, since it implies that a local AOD field distortion correction is not required. In other words, the scan field distortion effects are already accounted for when the scan field calibration transform 603 is applied.

Another interpretation of this approach is that the tertiary profiling filter displaces the galvo command away from the desired command, in raw galvo coordinates. The AODs simply provides a compensating displacement to make up this galvo beam angle displacement.

The AOD command outputs, in "raw galvo" coordinates, is then transformed (scale and rotation) to produce the "raw AOD" deflection commands. Applying the transformation to "raw galvo" coordinates also provides the opportunity to add AOD error correction terms to the tertiary AOD data. This is convenient, since the galvo controller error (which is filtered to produce AOD error correction data) is in raw galvo coordinates.

III. Tertiary Filter Limit on Process Velocity

The process of tertiary filtering, given a limited calibrated AOD field size, imposes a limit on process velocity. During tertiary filtering, a step change in velocity between process segments produces a transient response in the AOD command. For example, FIG. 7 graphically illustrates a tertiary filter response to velocity change according to one embodiment. The magnitude of this response is proportional to the step change in velocity, and the decay time is a function of the tertiary filter bandwidth and damping ratio.

Figure 7:
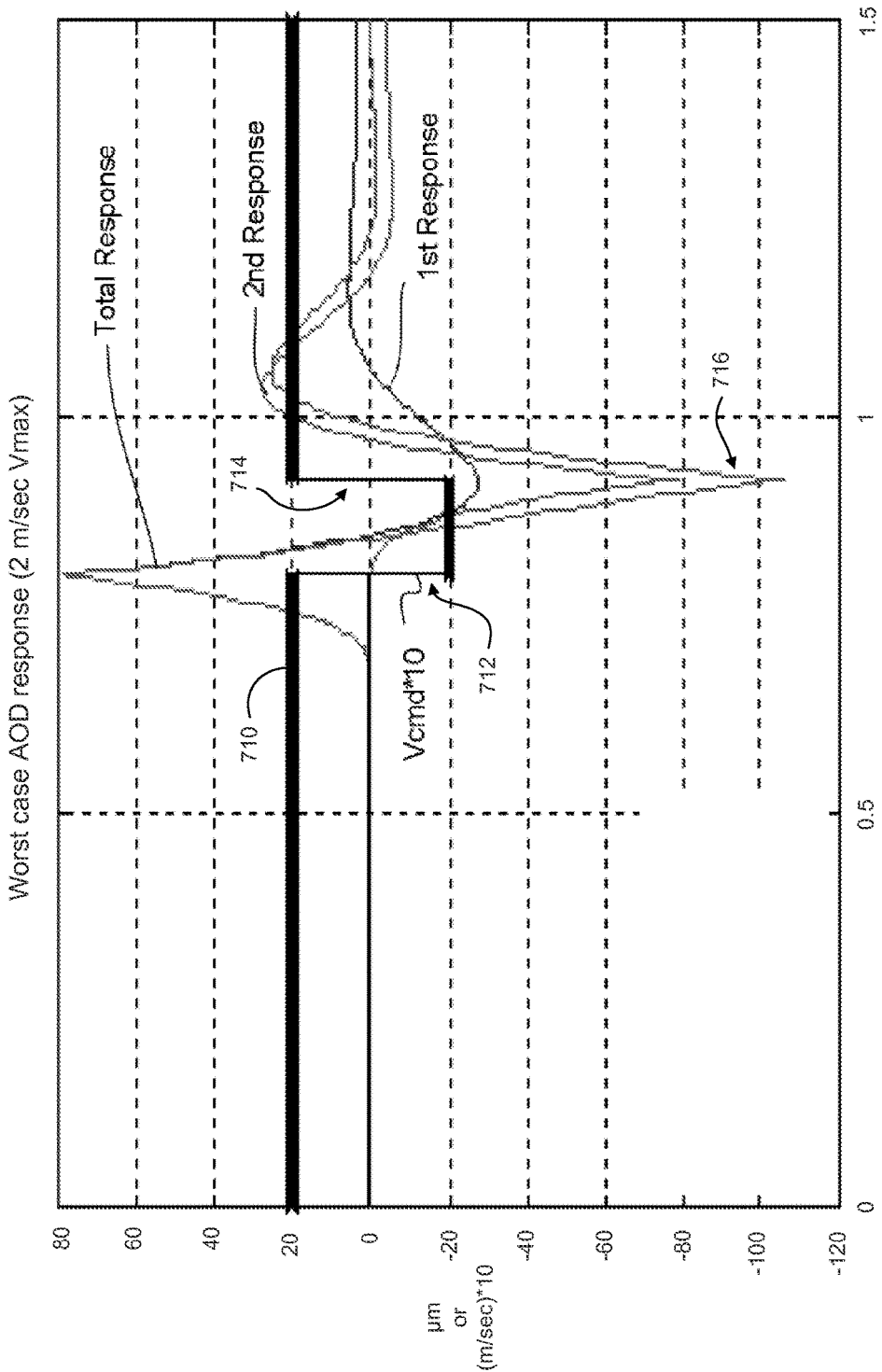
FIG. 7 graphically illustrates a tertiary filter response to velocity change according to one embodiment.

FIG. 7 shows a worst case velocity profile 710 that maximizes the AOD excursion, which occurs when one velocity change 710 (equals to 2*Vmax) is followed by a second velocity change 714, of equal magnitude but opposite sign, timed at the peak of the tertiary filter's overshoot 716 (about 0.12 msec after the velocity change, for a 3 kHz tertiary filter).

If an AOD transient scale factor is defined as "Ktrans," then for a process segment velocity change deltaV, $$\text{deltaAod} = K\text{trans} * \text{delta}V.$$

An example value of Ktrans is 26.6 µm/(m/sec), for a 4$^{th}$ order 3 kHz tertiary filter. Thus, for example, for a segment with 2 m/sec process velocity, which could make a +2 to −2 m/sec velocity change, the bound on deltaAod=2*(2 m/s)* (26.6 µm/(m/s))=106.4 µm.

IV. Example AOD Tool Settling Embodiments

To avoid or reduce the limits on process velocities imposed by tertiary filtering, certain embodiments disclosed herein insert a settling time before and after each tooling action. The peak AOD excursion occurs at the transition in velocity between inter-feature moves (typically high velocity) and tooling moves (typically lower velocities). This transition occurs both before tooling (on the approach to the tooling location) and after tooling (on the departure from the completed tooling location to the next location). By adding a settling delay on each end of the tooling period, the AOD excursion is allowed to settle to a lower value. This then allows higher inter-tooling velocities (for high throughput) while keeping the AOD travel excursion within the bounds of the system's AOD configuration.

Figure 8:
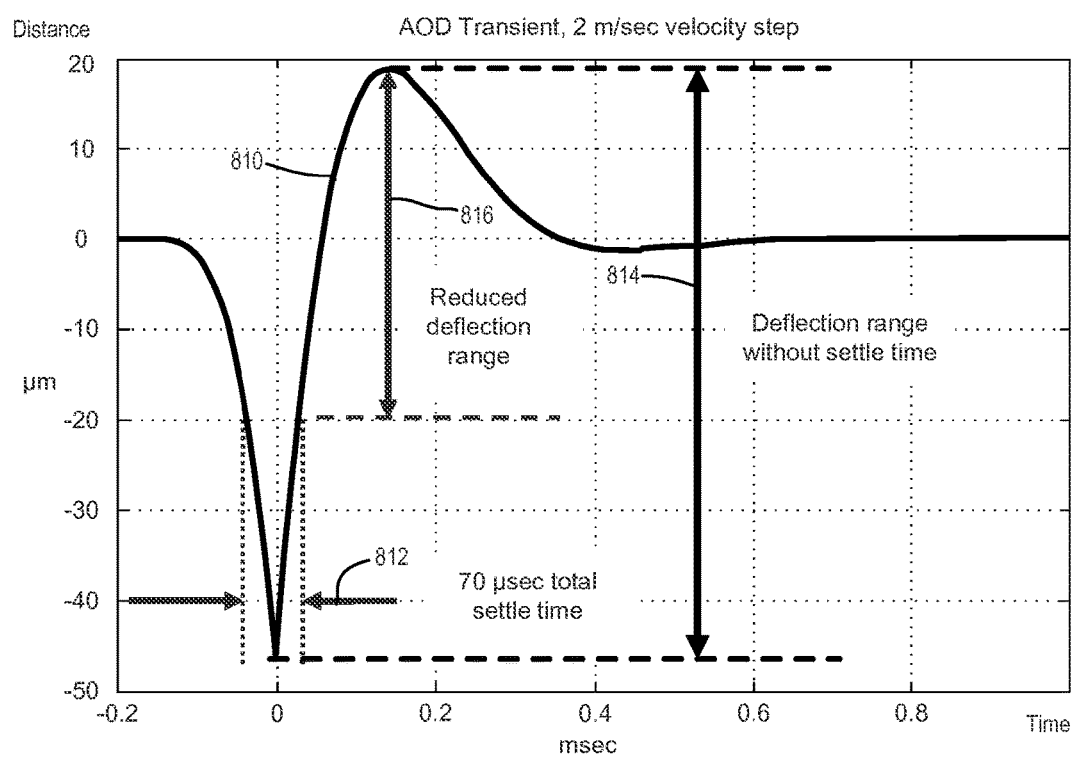
FIG. 8 graphically illustrates an example transient AOD command in response to a step change in beam velocity according to one embodiment.

FIG. 8 graphically illustrates an example transient AOD command 810 in response to a step change in beam velocity according to one embodiment. In this example, a sharp AOD deflection transient occurs around the time of the velocity change (t=0 in FIG. 8). A step change in velocity may occur, for example, when the beam trajectory stops to begin tooling, or when the beam trajectory begins a high-velocity move to the next feature after tooling is finished.

A settle time 812 (e.g., 70 μs in this example) at a peak value of the AOD deflection transient, which corresponds to the velocity change, reduces the range of AOD deflection. For example, FIG. 8 illustrates a deflection range 814 without settle time as compared to a reduced deflection range 816 provided by the settle time 812. While the transient in FIG. 8 illustrates the reaction to a step change in velocity, a similar settling approach can also apply to velocity profiles other than step changes. For example, such settling is used in certain embodiments for a ramped change in velocity (constant acceleration) or aggressively profiled change in velocity (e.g., sine profiled at a high bandwidth), or other changes in velocity.

Inserting small settle periods both before and after tooling (about the t=0 point) significantly reduces the range of AOD deflection in response to the inter-feature velocity step change. This allows the use of higher inter-feature velocities for a given AOD range, thereby increasing overall throughput.

Figure 9:
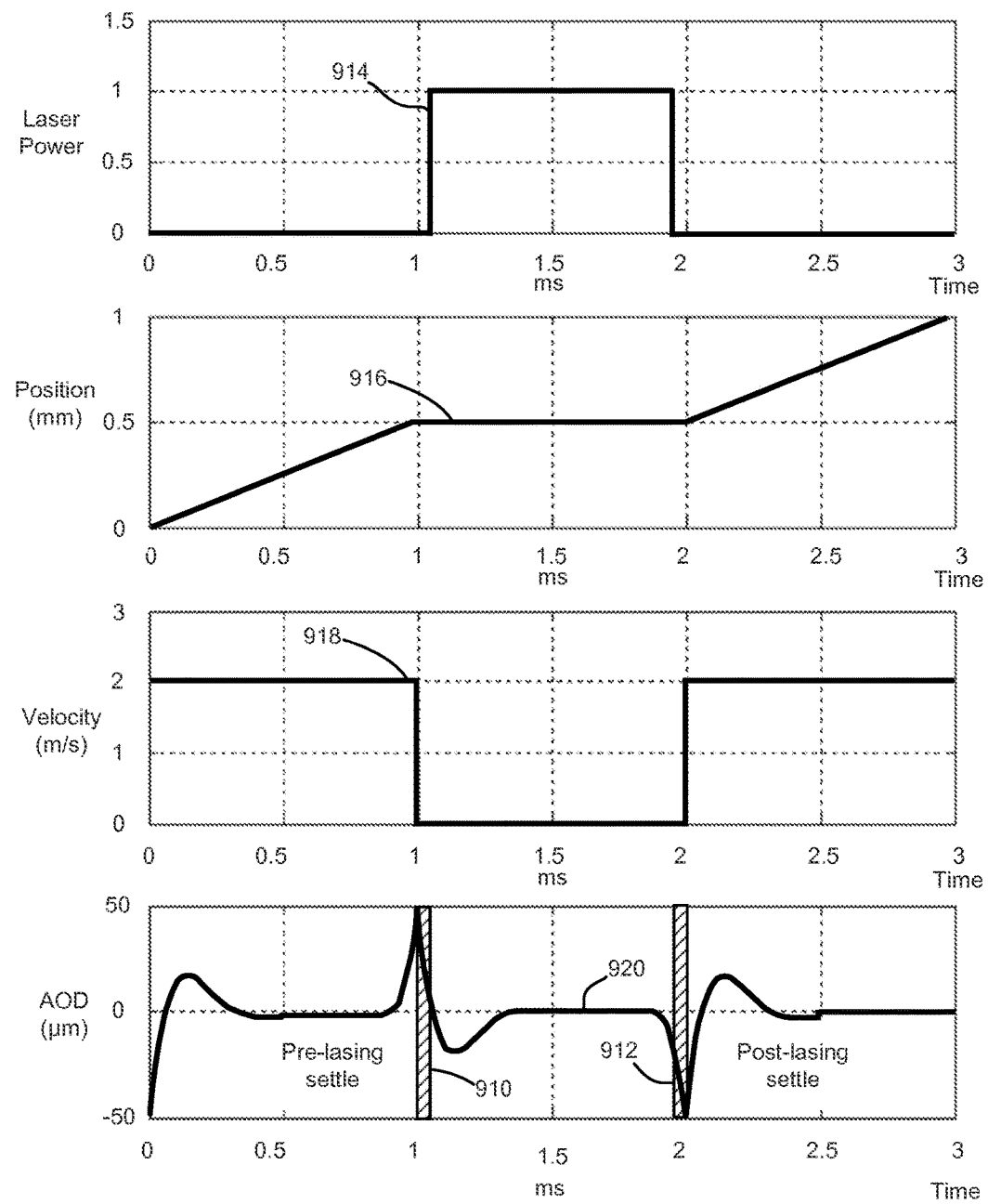
FIG. 9 graphically illustrates the settling process in the context of laser firing during feature processing according to one embodiment.

FIG. 9 graphically illustrates the settling process in the context of laser firing during feature processing according to one embodiment. In particular, FIG. 9 illustrates both a pre-lasing settle period 910 and a post-lasing settle period 912 that reduce the required AOD deflection range for a given inter-feature beam velocity. The timing of each settling period 910, 912 is shown with respect to a laser pulse 914, a beam trajectory position 916, a beam trajectory velocity 918, and transients in an AOD command 920. As shown, the pre-lasing settle period 910 begins when the position 916 reaches a target location and the velocity 918 steps down to 0 m/sec. the laser pulse 914 is not fired until after the pre-lasing settle period 910 is complete. The post-lasing settle period 912 begins when the laser pulse 914 ends. After completion of the post-lasing period 912, the velocity 918 steps up from 0 m/sec to 2 m/sec (for example) to start moving the beam trajectory position 916 to the next target. The setting periods 910, 912 both before and after the laser pulse allows for a reduced AOD deflection range, which in turn allows for higher velocities between successive target locations and improved throughput.

V. Example Tool Settling at Tooling Velocity and Trajectory

As discussed above, in some cases it is desirable to include tooling settling time for a workpiece feature, to allow beam positioner errors to settle toward zero. Certain embodiments discussed above dwell at the target or feature location, at zero beam velocity, for the desired settling time. This approach works well for stationary tooling actions (e.g., punches), but for tooling actions with circular trajectories (e.g., spiral, trepan, circles), the initiation of tooling action creates a dynamic transient in the beam positioner, possibly creating a beam positioning error that the settling time is meant to avoid.

For tooling actions with circular trajectories, another embodiment is to "settle" at the tooling location by executing the initial tooling trajectory for the specified settling time. For example, a circle tool trajectory can be commanded over an arbitrary number of full or partial revolutions. In certain such embodiments, variable-trajectory tools begin with their initial motion. For example, for a spiral tool that starts from an inner diameter, the settling time includes fractional or full repetitions of the inner diameter trajectory.

Figure 10:
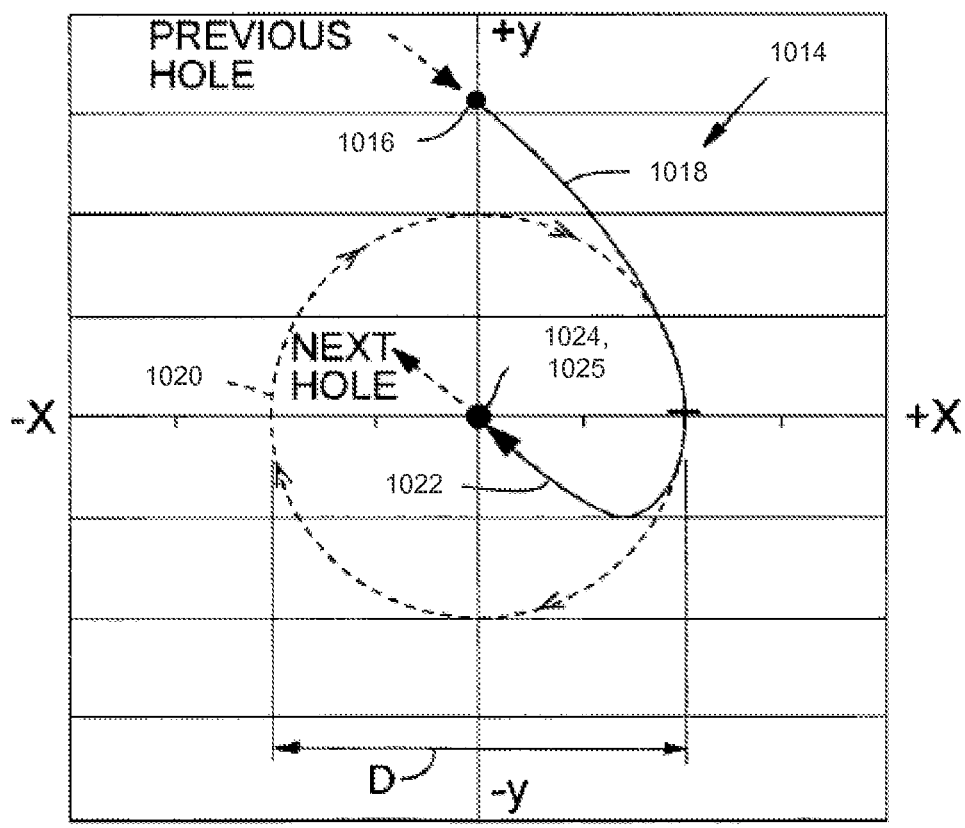
FIG. 10 schematically illustrates a circular tool pattern beam path according to one embodiment.

FIG. 10 schematically illustrates a circular tool pattern beam path 1014 according to one embodiment. The beam path 1014 starts at a starting location 1016 (shown as a dot), includes an entry segment 1018, a 360-degree circular segment 1020 (shown in dashed lines), an exit segment 1022, and an ending location 1024 (shown as a dot), which is also a center 1025 of circular segment 1020. Circular segment 1020 has a diameter D, corresponds to the perimeter or periphery of a hole to be processed, and can have other than a 360-degree extent. In this example, the acceleration of entry segment 1018 is zero (constant velocity), but the acceleration of exit segment 1022 is twice the acceleration of circular segment 1020. In one embodiment, the beam path follows the circle segment 1020 one or more times during a first settle period before turning on the laser, and the beam path follows the circle segment 1020 one or more times during a second settle period after laser processing.

An advantage of circular trajectory settling is that the non-sinusoidal transients created in the transition from the feature-to-feature move trajectory to the tooling trajectory action can decay, reducing the tracking error within the tooling action and thus improving the quality of the processed feature. In general, the beam positioning components (galvos and stages) can track a repetitive sinusoidal beam command much better than the initial transient beam command.

In addition or in other embodiments, the initial sinusoidal motion is repeated rather than simply maintaining the initial tooling velocity (magnitude and direction) for the desired settle time. For very high speed tooling (e.g., about 1 m/sec to 2 m/sec) and large settle times (e.g., about 100 msec), this may require very large approach distances that become cumbersome for the beam positioner—requiring long setup moves, and exceeding the galvo field size in applications which are preferably processed within a single galvo field.

It will be understood by those having skill in the art that many changes may be made to the details of the above-described embodiments without departing from the underlying principles of the invention. The scope of the present invention should, therefore, be determined only by the following claims.

The invention claimed is:

1. A method of processing a workpiece by operation of a laser tool, the laser tool defining a beam axis along which a laser beam propagates, the method comprising:
   causing relative movement, at a first velocity, between the beam axis and a surface of the workpiece to direct the beam axis toward a first target location of the workpiece;
   upon arriving at or near the first target location, changing the velocity of the relative movement from the first velocity to a second velocity;
   in response to the change to the second velocity, initiating a first settle period to delay emission of a laser pulse so that a start of the laser pulse is incident at the first target location after completion of the first settle period;

upon completion of the emission of the laser pulse incident at the first target location, initiating a second settle period; and after completion of the second settle period, changing from the second velocity to a third velocity to cause relative movement, at the third velocity, between the beam axis and the surface of the workpiece to direct the beam axis from the first target location toward a second target location of the workpiece.

2. The method of claim 1, wherein causing the relative movement between the beam axis and the surface of the workpiece comprises:

imparting, using a first positioning system, a first portion of the relative movement between the beam axis and the surface of the workpiece; and imparting, using a second positioning system, a second portion of the relative movement between the beam axis and the surface of the workpiece, the second portion of the relative movement superimposed on the first portion of relative movement.

3. The method of claim 2, wherein the second positioning system comprises at least one deflection device selected from the group consisting of: an acousto-optic deflector (AOD), an acousto-optic modulator (AOM), an electro-optic deflector (EOD), an electro-optic modulator (EOM), and a fast steering mirror (FSM), wherein the method further comprises determining the transient response based on a tertiary filter configured to provide the position commands to the at least one deflection device.

4. The method of claim 1, wherein the first velocity is greater than the second velocity.

5. The method of claim 1, wherein the third velocity is different than the first velocity.

6. The method of claim 1, wherein the second velocity is zero so that the beam axis dwells at the first target location while at least a portion of the laser pulse is incident thereon.

7. The method of claim 1, further comprising:

selecting the second velocity based on a tooling velocity at the first target location, the tooling velocity corresponding to a circular tooling trajectory at the first target location; and during the first settle period, and before the start of the laser pulse is incident at the first target location, causing relative movement between the beam axis and the surface of the workpiece along the circular tool trajectory at the first target location.

8. The method of claim 7, further comprising:

during the second settle period, and after completion of the end of the laser pulse incident at the first target location, continuing to cause the relative movement between the beam axis and the surface of the workpiece along the circular tool trajectory at the first target location.

9. The method of claim 1, wherein changing from the first velocity to the second velocity or from the second velocity to the third velocity comprises a step change in velocity.

10. The method of claim 1, wherein the third velocity is about equal to the first velocity.

11. The method of claim 1, wherein the third velocity is greater than the second velocity.

12. The method of claim 1, wherein changing from the first velocity to the second velocity or from the second velocity to the third velocity comprises a velocity change selected from the group consisting of: a ramped change and a sine profiled change.

13. A laser processing apparatus to form or process features within one or more materials of a workpiece, the laser processing apparatus comprising:

a laser system to generate a beam of laser pulses;

a first beam positioning system to impart relative movement between a beam axis and a surface of the workpiece;

a second beam positioning system to impart relative movement between the beam axis and the surface of the workpiece;

a controller to coordinate the laser system with the relative movement imparted by the first beam positioning system and the second beam positioning system, the controller configured to:

delay the laser system from emitting the beam of laser pulses after the beam axis arrives at a target location relative to the surface of the workpiece; and delay the first beam positioning system and the second beam positioning system from moving the beam axis away from the target location after the target location has been processed by the beam of laser pulses.

14. The laser processing apparatus of claim 13, wherein the second beam positioning system comprises one or more deflection devices selected from a group comprising an acousto-optic deflector (AOD), an acousto-optic modulator (AOM), an electro-optic deflector (EOD), and an electro-optic modulator (EOM), and wherein the controller is further configured to determine the transient response based on a tertiary filter configured to provide the position commands to the one or more deflection devices.

15. The laser processing apparatus of claim 14, wherein the controller is further configured to reduce a deflection range needed for the second beam positioning system to respond to a high-bandwidth position command by aligning, in time, a first peak value of the transient response with a first settle period before emitting the beam of laser pulses after the beam axis arrives at a target location and a second peak value of the transient response with a second settle period before moving the beam axis away from the target location after the target location has been processed.

16. The laser processing apparatus of claim 13, wherein the controller is further configured to:

while delaying the laser system from emitting the beam of laser pulses after the beam axis arrives at a target location, impart circular motion to the beam axis, the circular motion corresponding to a hole to be processed at the target location.

17. The laser processing apparatus of claim 13, wherein the controller is further configured to:

while delaying the first beam positioning system and the second beam positioning system from moving the beam axis away from the target location after the target location has been processed by the beam of laser pulses, impart circular motion to the beam axis, the circular motion corresponding to a hole that was processed at the target location.

18. A method of processing a workpiece by operation of a laser tool, the laser tool defining a beam axis along which a laser beam propagates, the method comprising:

causing relative movement, at a first velocity, between the beam axis and a surface of the workpiece to direct the beam axis toward a first target location of the workpiece;

upon arriving at or near the first target location, changing from a first velocity to a second velocity;

in response to the change to the second velocity, initiating a first settle period to delay emission of a laser pulse so that a start of the laser pulse is incident at the first target location after completion of the first settle period;

upon completion of the emission of the laser pulse incident at the first target location, initiating a second settle period;

after completion of the second settle period, changing from the second velocity to a third velocity to cause relative movement, at the third velocity, between the beam axis and the surface of the workpiece to direct the beam axis from the first target location toward a second target location of the workpiece; and reducing a deflection range needed for responding to a high-bandwidth position command by aligning, in time, a first peak value of a transient response of the second positioning system to position commands with the first settle period before the start of the laser pulse is incident at the first target location and a second peak value of the transient response with the second settle period before changing from the second velocity to the third velocity.

* * * * *